United States Patent [19]
Pascuzzi

[11] 3,802,351
[45] Apr. 9, 1974

[54] MOBILE PENDENT SUPPORT SYSTEM

[76] Inventor: Arthur Pascuzzi, 10250 S.W. North Dakota St., Tigard, Oreg. 97223

[22] Filed: Aug. 21, 1972

[21] Appl. No.: 282,394

[52] U.S. Cl................ 105/150, 104/112, 191/12 R
[51] Int. Cl............................................. B61b 3/00
[58] Field of Search ....... 104/89, 93, 106, 110, 112, 104/113; 105/150, 151, 156; 254/192–197; 191/12 R

[56] References Cited
UNITED STATES PATENTS

| | | | |
|---|---|---|---|
| 2,449,703 | 9/1948 | Johnson | 254/193 |
| 3,704,350 | 11/1972 | Itom | 105/151 |
| 1,870,510 | 8/1932 | Hespeler | 104/112 |

Primary Examiner—M. Henson Wood, Jr.
Assistant Examiner—D. W. Keen
Attorney, Agent, or Firm—Daniel P. Chernoff; Jacob E. Vilhauer, Jr.

[57] ABSTRACT

A mobile pendent support system for transporting a length of festooned line comprises a series of carrier hangers riding along a carrier cable. The carrier hangers each comprise a grooved wheel rotatably mounted within a protective housing for riding on the carrier cable. A clamp member for fastening to a respective coil of the festooned line is attached by a coupling ring to the lower end of the carrier housing. Gagging of the festooned line is prevented by the action of the coupling ring in limiting rotation of the clamp member with respect to the vertical axis of the carrier hanger. The housing is formed of two substantially identical facing plates which may be readily disassembled for repair and then reassembled to be placed at a selected point along the carrier cable independently of the other carrier hangers supporting the line.

5 Claims, 4 Drawing Figures

PATENTED APR 9 1974  3,802,351
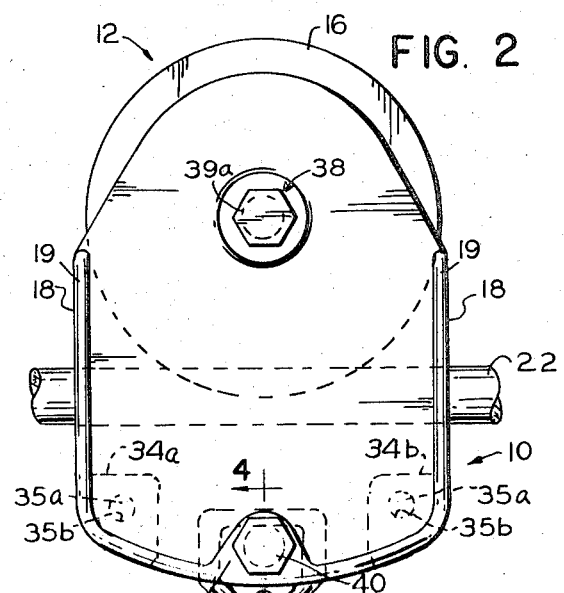
FIG. 2
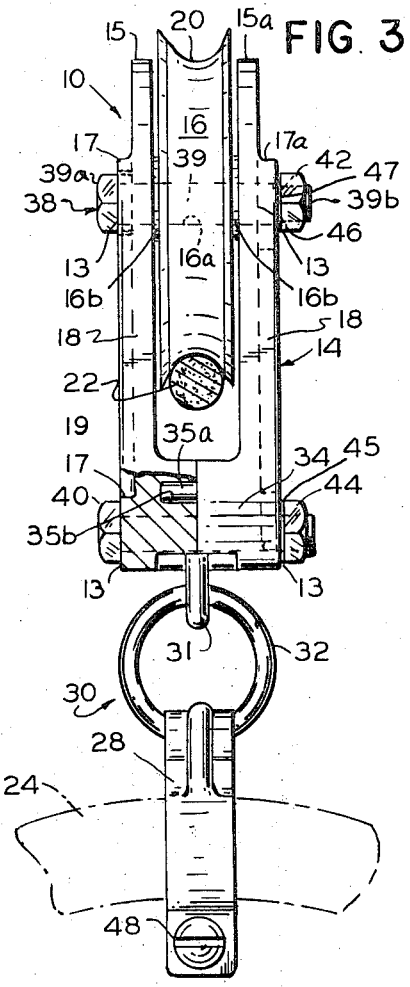
FIG. 3
FIG. 4
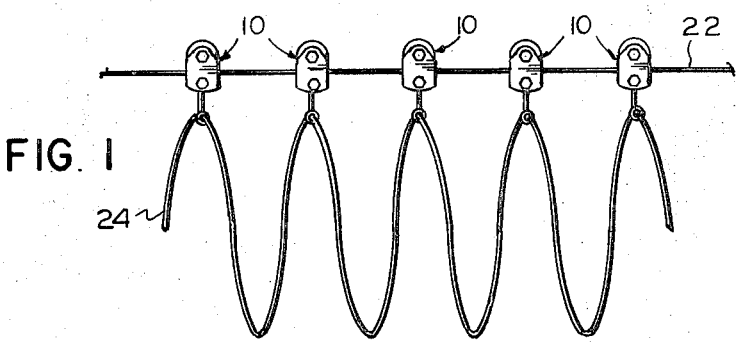
FIG. 1

MOBILE PENDENT SUPPORT SYSTEM

BACKGROUND OF THE INVENTION

The invention relates to a mobile pendent support system which comprises a series of carrier hangers for supporting and transporting a festooned (coiled) line between respective retracted and extended positions. Various systems for supporting festooned electrical power, pneumatic and hydraulic lines connecting to movable machines such as overhead cranes and the like are known to the art. U.S. Pat. Nos. 460,514 to Stadelman and 2,571,832 to Chapin each describe a series of carrier hangers riding along an overhead track with the hangers having a freely-swiveling clamp member to provide mobility for the line coils to which they are fastened as the coils are expanded and contracted while the apparatus to which the line is attached is moved between its two extreme positions. However, the unrestrained swiveling action of the clamp can cause gagging, i.e., wrapping of the line about the carrier as it moves along the overhead track, resulting in tangling and possible damage to the line and carrier system. In the Chapin patent, a pair of wheels, which ride on the opposed laterally projecting flanges of a beam, are connected to a flexible member framing the lower portion of the beam. Stadelman provides a pair of wheels attached to a one-piece trolley frame traveling on a monorail. In both of these patents, the framing member does not protectively encase the wheel nor does it completely surround the structure on which it travels. Therefore, the possibility of interference between adjacent carrier hangers exists and, moreover, a sharp impact aplied to the carrier or hanger portions could result in damage, misalignment or detachment from the plane of travel. Due to the structure of the framing members and the nature of the surface being traveled, a pair of wheels are employed to impart additional stability to a tracked system of this type which in turn increases the cost of manufacture of the item. If any of these prior art carriers were damaged or otherwise required removal from the track for repair or replacement, disassembly of the framing member from the rail or beam would be a cumbersome and time consuming procedure requiring removal of at least two awkwardly located bolts. Another known device includes an awning pulley and S-shaped hook assembly which supports a festooned line within a hanger and carries the line along a tagline wire. However, the construction of this pulley hanger does not permit its removal from either the wire or the line without the associated removal of adjacent awning pulley hangers nor does it provide a means for preventing gagging.

Accordingly, a need exists for an improved mobile pendent support system for a festooned line which is inexpensive, rugged construction, which is both readily mountable and removable and which will prevent gagging of the supported line.

SUMMARY OF THE INVENTION

The present invention is directed to a novel and improved mobile support system of the general type described which includes a series of carrier hangers each comprising an upper carrier portion for transporting a portion of a festooned line along the carrier cable and a hanger portion supporting the line.

The carrier portion of the system is comprised of a wheel rotatably attached to a protective housing, the housing being formed of a pair of substantially identical, detachable facing plates which completely surround the segment of the carrier cable passing therein. The hanger portion comprises a link and coupling ring assembly which engages an attachment member in the protective casing of the carrier portion and connects to a clamp member supporting the festooned line.

Additional structural features of the carrier portion of the hanger assembly include a pair of interlocking connector means formed on the lower inside corners of each facing plate for securing and aligning the facing plates together, and a pair of shoulder members on the casing which protrude beyond and shield the rim of the wheel. A dual-acting nut and axle-bolt assembly serves both to rotatably support the wheel and, in conjunction with the connection means, joins the individual facing plates together and holds them in place. The facing plates contain a socket sized to accept and hold the axle-bolt in place while the nut is being securely tightened.

The novel constructional features of the mobile pendent support system of the present invention provide it with a number of important operational advantages. First, the construction of the hanger portion prevents rotation of the festooned line in excess of 180° with respect to the vertical axis of the carrier hanger, thereby eliminating gagging of the line. This permits the uninterrupted movement of the carrier hanger along the carrier cable without loss of time or resultant damage to any of the structural components. To insure limited rotation of the hanger, a retainer groove is provided within the attachment member formed in the casing for restraining rotational movement of the hanger portion.

Secondly, the use of substantially identical facing plates to form the carrier housing permits use of a single standardized plate die, thereby reducing the overall cost of manufacture. In addition, assembly and disassembly of the housing is readily accomplished by merely removing a single axle-bolt and nut fastener. Thus removal or attachment of a carrier hanger can be achieved at any point along either the cable or the line without requiring removal of adjacent hangers.

It is therefore a principal objective of the present invention to provide a new and improved system of the type comprising a carrier cable and a series of movable hangers for supporting a festooned line.

It is a further objective of the present invention to provide a carrier hanger for such a festooned line support system which is of economic and rugged construction, is readily attachable or removable at any point along the carrier cable, and is adapted so as to avoid line gagging or tangling interaction between adjacent hangers.

The foregoing objectives, features and advantages of the present invention will be more readily understood upon consideration of the following detailed description of the invention taken in conjunction with the accompanying drawings.

DESCRIPTION OF THE DRAWINGS

FIG. 1 is a view of a series of carrier hangers constructed according to the present invention supporting a festooned line on a carrier cable.

FIG. 2 is a side view of the carrier hanger shown in FIG. 1.

FIG. 3 is a partially sectional end view of the carrier hanger.

FIG. 4 is an enlarged sectional view, taken along line 4—4 of FIG. 2.

DESCRIPTION OF THE PREFERRED EMBODIMENT

Referring initially to FIG. 1, a plurality of carrier hangers, each designated generally as 10, travel along a carrier cable 22 transporting a festooned line 24 between respective retracted and extended positions. The festooned line to be supported can be an electrical cord, an air or hydraulic hose, or combination thereof used to supply energy to a movable machine such as a traveling crane, sawmill carriage or the like.

Referring now to FIGS. 2-4, the carrier hangers 10 are each comprised of carrier and hanger portions, 12 and 30 respectively. Carrier portion 12 comprises a protective housing 14 formed by joining a pair of facing plates 15 and 15a of die-cast nylon or other suitable material which are substantially identical, enabling both to be formed from the same die. The facing plates are secured in position by upper fastening means 38 and bolt 40, respectively, hereinafter discussed in greater detail. The facing plates 15 and 15a each contain upper and lower openings 13 about which rims 17 and 17a, respectively, are embossed. The rims are substantially identical in structure, the difference residing in the inclusion in embossed rim 17a of a socket 46 which is sized to accept the hexagonal head 39a of axlebolt 39 and hold it in place while the self-locking nut 42 is being secured in position.

Connector means, comprising a pair of mating bosses 34a and 34b, extend outwardly from the lower inside corners of each facing plate. At the outer end of boss 34a is a dowel pin 35a and centrally located within boss 34b is a mating bore 35b sized to receive dowel pin 35a. As more readily seen in the sectional view of FIG. 3, when attachment of a pair of plates is desired, the inside of the respective plates are aligned facing each other and the respective dowel pin and bore portions of each boss are then matingly joined together. This interlocking connection prevents the facing plates forming the casing from being misaligned or from moving to an askewed position with respect to each other.

Attachment means 26 for a link ring 31, comprising a third pair of projecting bosses 26a, is centrally located along the bottom edge of the plate between the respective connector means 34a and 34b. A portion of the top edge of the extended faces of bosses 26a is indented and, upon connection of the respective facing plates, as more clearly shown in FIG. 4, retainer groove 36 for the link ring 31 is formed. Bolt 40 connects together facing plates 15 and 15a and is held in place by nut 44 tightening against locking washer 45. Fastening means 38 for wheel 16 comprises a supporting axle-bolt 39 having a bolt head portion 39a at one end and a threaded end portion 39b at the other end. Nut 42 engages the threaded end 39b and rotatably secures the wheel in position. The axle-bolt 39 is provided with a suitable shoulder-stop 47 to allow adequate clearance with the facing plates for free rotation of the wheel. The wheel rims formed about the passageway openings, shown as 16b, are embossed, allowing the wheel to rotate within the protective casing with only a minimum amount of interaction with the inner surface of the facing plates. To improve the stability of the carrier hanger 12 as it rides along the carrier cable, a circumferential groove 20 is provided within the perimeter of the wheel. The wheel 16 is enclosed with housing 14 so that shoulders 18 formed in facing plates 15 and 15a extend beyond the periphery of the wheel and shield it from impact and from interaction with adjacent hangers traveling along the carrier cable. As additional reinforcement for the shoulder portion of each facing plate, an embossed border 19 along the outer periphery of the plate is provided. For durability and long life the wheel member 16 is preferably constructed of a self-lubricating impact-resistant material such as nylon.

The lower end of the hanger assembly includes a coupling ring 32 which interconnects clamp 28 to link 31 depending from the hanger housing. As shown in FIG. 4, link 31 is seated within retainer groove 36 for limiting the swiveling rotation of the festooned line 24 about the vertical axis of the carrier hanger 10. To further aid in accomplishing the objective of limiting rotation, the coupling link 31 includes a horizontal upper portion which fits within retainer groove 36 so that substantially the entire horizontal portion of the link is securely seated. This arrangement of link 31 and coupling link 32 allows a limited amount of free swiveling in either direction of the supported line, preventing any rotation beyond the 180°. In this manner, gagging of the festooned line is prevented. A nut and bolt fastener 48, 50 secures the clamp in place and, by adjustment of the bolt 50, allows varying sizes of line to be accommodated.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A carrier hanger traveling on a carrier cable and adapted for supporting and transporting respective coil segments of a festooned line comprising:

a. a carrier portion for riding on said carrier cable; and b. a hanger portion dependent from said carrier portion including upper and lower links interlockingly coupled together, said upper link being fixedly connected to said carrier portion and said lower link being adapted to clamp to a respective coil segment of said festooned line, said link coupling allowing a limited amount, less than 180°, of free rotational movement of said festooned line segment about the vertical axis of said carrier hanger whereby to prevent entanglement of the coils in said festooned line.

2. The carrier hanger of claim 1 wherein said carrier portion further comprises a housing comprised of a pair of facing plates including attachment means thereon connecting to said upper link, a wheel rotatably mounted within said housing and adapted to ride along said carrier cable, connector means for holding said plates in alignment and preventing movement to an askew position with respect to each other, and shoulder means, protruding from said housing beyond the periphery of said wheel, for shielding said wheel and preventing interaction between adjacent carrier hangers.

3. The carrier hanger of claim 2 wherein said attachment means comprises a retaining groove located on said housing for receiving and seating a portion of said upper link therein.

4. The carrier hanger of claim 2 further characterized in that said connector means is formed of a pair of bosses extending outwardly from the lower inside corners of each of said facing plates, said pairs of bosses including at their outer ends respectively mating dowel pin and bore means.

5. The carrier hanger of claim 2 further including a dual-acting nut and axle-bolt assembly for rotatably supporting said wheel and holding said facing plate together, said nut and axle-bore assembly including a shoulder stop for providing adequate clearance between said facing plates and said wheel so as to allow said wheel to rotate freely.

* * * * *